United States Patent [19]

Fujihira et al.

[11] Patent Number: 5,072,698

[45] Date of Patent: Dec. 17, 1991

[54] INTAKE APPARATUS FOR ENGINE

[75] Inventors: Shinji Fujihira; Yuko Yanagidani, both of Hiroshima; Isao Tohda, Yokohama; Shinji Kanbara, Hiroshima, all of Japan

[73] Assignee: Mazda Motor Corporation, Hiroshima, Japan

[21] Appl. No.: 529,572

[22] Filed: May 29, 1990

[30] Foreign Application Priority Data

May 30, 1989 [JP] Japan .................................. 1-136947
Dec. 11, 1989 [JP] Japan .................................. 1-322184

[51] Int. Cl.⁵ .......................................... F02M 35/10
[52] U.S. Cl. .............................................. 123/52 MB
[58] Field of Search ......... 123/52 M, 52 MB, 52 MV, 123/52 MC, 52 MF

[56] References Cited

U.S. PATENT DOCUMENTS

| 4,735,177 | 4/1988 | Koike ............................ 123/52 MC |
| 4,760,703 | 8/1988 | Mihami et al. .................. 123/52 M |
| 4,765,285 | 8/1988 | Kobayashi ..................... 123/52 MB |
| 4,862,840 | 9/1989 | Matsunaga et al. ........... 123/52 MC |
| 4,878,460 | 11/1989 | Uchida et al. ................ 123/52 MV |

*Primary Examiner*—David A. Okonsky

[57] ABSTRACT

An intake apparatus for an engine is provided with an intake duct, arranged in an engine room, for supplying intake air to the engine. An auxiliary duct is connected to the intake duct and designed so that the intake air can be further introduced thereto. A valve unit is arranged in the auxiliary duct, for causing the auxiliary duct to communicate with the intake duct in a specific driving state requiring a high engine output.

14 Claims, 10 Drawing Sheets

INTAKE APPARATUS FOR ENGINE

BACKGROUND OF THE INVENTION

The present invention relates to an intake apparatus for an engine and, more particularly, to an intake apparatus for an engine in a vehicle which has, in an engine room, a cooling duct for introducing travel wind to a cooling device such as an intercooler.

An intake duct for supplying intake air to a combustion chamber is equipped in an engine. The diameter of the intake duct is determined with reference to the size of a throttle portion provided to the intake duct. For this reason, the intake duct has a relatively elongated shape.

Some engines with exhaust turbo chargers have, in their air intake systems, intercoolers for cooling intake air. As the intercooler, a technique described in Japanese Utility Model Laid-Open No. 63-58030 is known. As disclosed in this prior art, many intercoolers are of an air cooling type, which cools intake air heated by a turbo charger using travel wind introduced to it. In the case of an air cooling type intercooler, a duct for introducing travel wind is designed to have a larger path sectional area than that of an intake duct since it must introduce a large amount of air. In addition, the duct is arranged to effectively introduce travel wind by utilizing a dynamic pressure produced by traveling.

An intake duct is designed to have a relatively small diameter so that intake air is most efficiently supplied to a combustion chamber in a normal driving state. Such an intake duct cannot supply a necessary amount of air to an engine within a short response time especially when a high output is required like in an immediate acceleration state. In order to solve this problem, an auxiliary duct for introducing intake air only when a high output is required may be arranged in addition to a conventional intake duct. However, it is difficult to dispose such an auxiliary duct since an engine room has a limited space, in particular, since a bonnet tends to have a low profile in recent years.

In a known arrangement of the exhaust turbo charger described above, two turbo chargers, i.e., a low-load charger with a small A/R, and a high-load charger with a large A/R are arranged, as disclosed in, e.g., Japanese Patent Laid-Open No. 60-216031. In this prior art, intake air is compressed by the low-load charger in a low-load driving state. In a high-load driving state, intake air is compressed by both the low- and high-load chargers. Reference symbol A denotes a minimum area of an outlet pipe in a turbine, and reference symbol R denotes a distance from the center of rotation of the turbine to the central axis of the outlet pipe.

When the two turbo chargers are arranged, they are connected to air cleaners via independent low- and high-load intake paths, respectively. In general, the layout of these two intake paths is determined according to that of an engine and peripheral devices.

In a low-load state including an idling state before or after warming up of an engine, an intake air amount and a fuel supply amount are small, and a combustion property tends to be easily impaired. In addition, a requirement for a response time upon start of a vehicle becomes severer than in a high-load driving state. When the layout of the low- and high-load intake paths is determined according to that of the engine and its peripheral devices, as described above, a long low-load intake path must be arranged, and an intake response time is undesirably prolonged. In addition, the low-load intake path must be arranged on an upper portion of an engine room having a relatively low environmental temperature, and, hence, gasification and atomization of fuel are not accelerated, resulting in an impaired combustion property.

SUMMARY OF THE INVENTION

The present invention has been made in consideration of the above situation, and has as its principal object to provide an intake apparatus for an engine, which, when a cooling duct for introducing travel wind to, e.g., an intercooler is arranged in an engine room, can supply a sufficient amount of low-temperature intake air from the outside of the engine room within a short response time by utilizing this duct when a high output is required.

It is another object of the present invention to provide an intake apparatus for an engine, which can positively transmit a sporty engine intake sound to a passenger room in an acceleration state to give a comfortable driving feeling to passengers.

It is still another object of the present invention to provide an intake apparatus for an engine which can shorten a response time and can improve a combustion property in a low-load driving state.

In order to achieve the above objects, according to one aspect of the present invention, there is provided an intake apparatus for an engine, which comprises an intake duct, arranged in an engine room, for supplying intake air to the engine, an auxiliary duct connected to the intake duct and designed so that the intake air can be further introduced thereto, and valve means, arranged in the auxiliary duct, for causing the auxiliary duct to communicate with the intake duct in a specific driving state requiring a high engine output.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such an example, however, is not exhaustive of the various embodiments of the invention, and therefore reference is made to the claims which follow the description for determining the scope of the invention.

DETAILED DESCRIPTION OF THE PREFERRED EMBODIMENTS

An arrangement of an embodiment of an intake apparatus for an engine according to the present invention will be described in detail below with reference to FIGS. 1 to 10 of the accompanying drawings.

An intake apparatus 10 of this embodiment is arranged for a rotary piston engine comprising a turbo charger and an intercooler.

Figure 1:
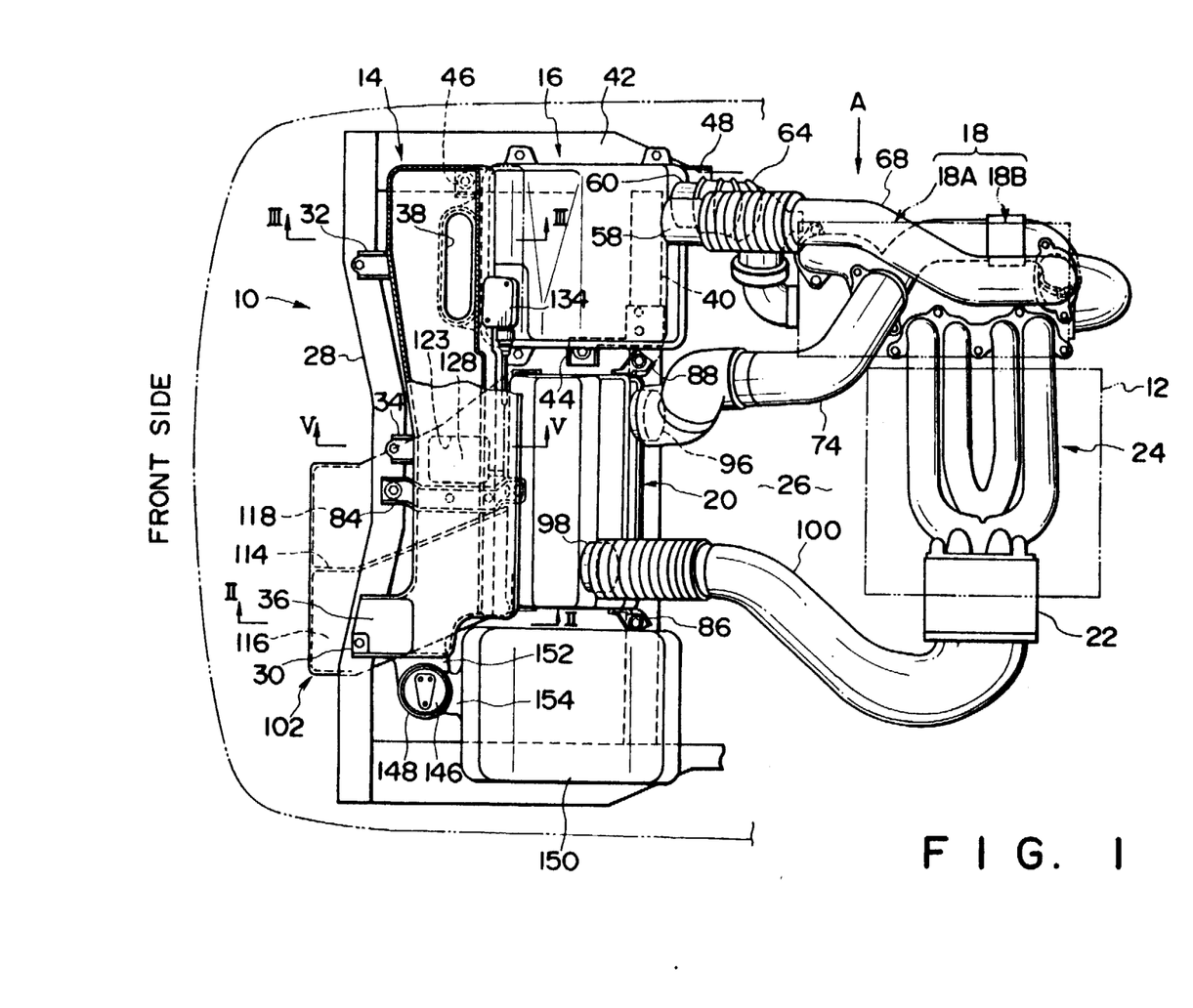
FIG. 1 is a plan view showing an arrangement of an embodiment of an intake apparatus for an engine according to the present invention.

As shown in FIG. 1, an intake apparatus 10 connected to a rotary piston engine 12 having two rotors comprises an intake duct 14 for taking external intake air, an air cleaner 16 for filtering the intake air taken from the intake duct 14, a turbo charger unit 18 for compressing the intake air filtered by the air cleaner by energy of an exhaust gas, and an intercooler 20 for cooling the charged intake air compressed by the turbo charger unit 18. Note that the intake air cooled by the intercooler 20 is supplied to combustion chambers of the engine 12 via a throttle valve unit 22 and an intake manifold 24.

The intake duct 14 is formed of a hollow duct member having a closed sectional shape, and extends along a widthwise direction of a vehicle in an upper front portion of an engine room 26. The intake duct 14 is fixed to and supported on a first cross member 28 at a total of three positions, i.e., via a flange portion 30 provided to the left end portion (FIG. 1) of the duct 14, and a pair of brackets 32 and 34 respectively arranged at the right end portion and the central portion (FIG. 1) of the duct 14. The first cross member 28 is arranged on the front side of the vehicle, and extends along the widthwise direction of the vehicle. An intake entrance 36 open to the front side is provided to the left end portion of the intake duct 14, and an intake exit 38 like an elongated hole is open to a right portion of a bottom plate for defining the bottom surface of the intake duct 14.

Figure 3:
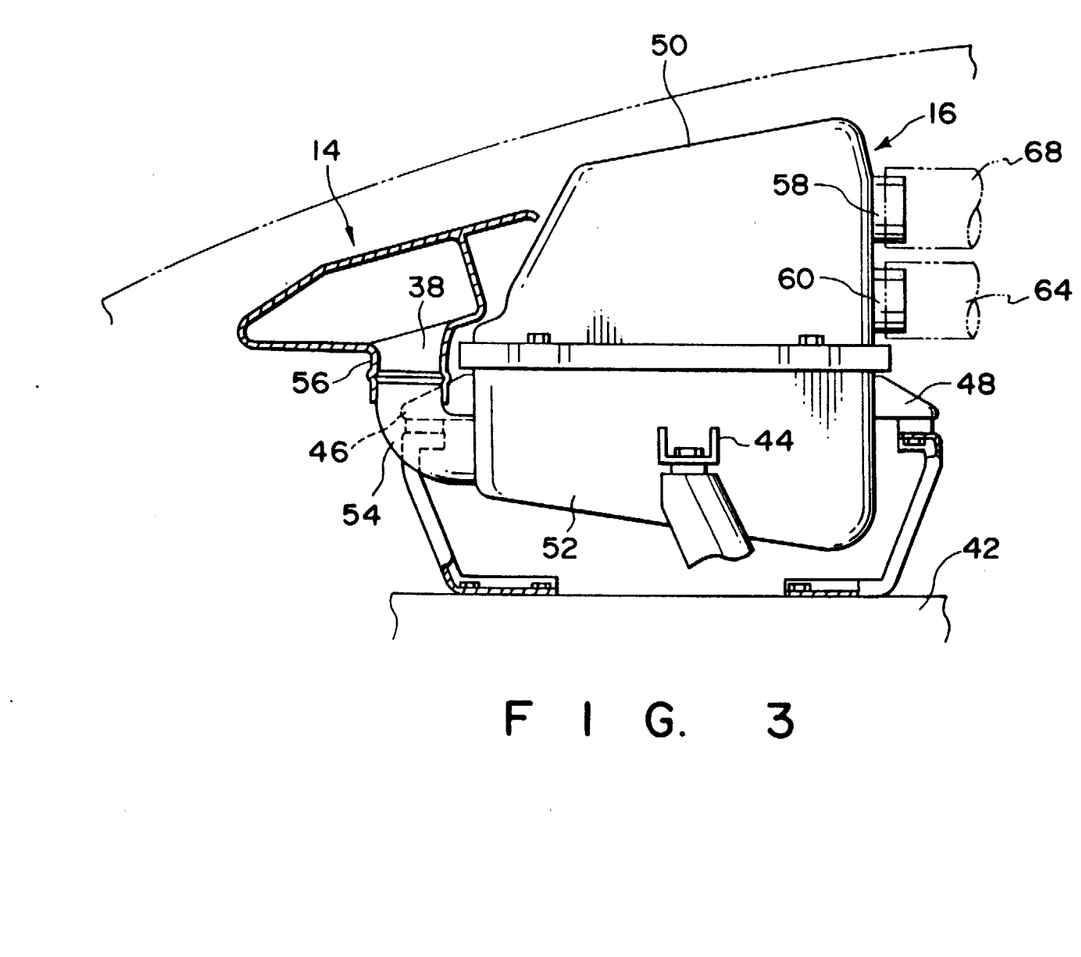
FIG. 3 is a sectional view particularly showing an air cleaner taken along a line III—III in FIG. 1.

The air cleaner 16 described above is arranged behind the right portion of the intake duct 14, as shown in FIGS. 1 and 3. The air cleaner 16 is fixed to a second cross member 40 and a right side frame 42 via brackets 44, 46, and 48. The second cross member 40 extends along the widthwise direction of the vehicle in the central portion of the engine room 26. The right side frame 42 extends along a back-and-forth direction of a lower right portion of a vehicle body.

The air cleaner 16 comprises upper and lower cases 50 and 52, as shown in FIG. 3. A joint pipe 54 projects from the front surface of the lower case 52. A joint portion 56 projects downward from the intake exit 38 of the intake duct 14. The joint portion 56 is connected to the joint pipe 54. In this manner, intake air in the intake duct 14 is introduced into the lower case 52 of the air cleaner 16 via the intake exit 38 and the joint pipe 54. After dust and the like are removed from the intake air by the air cleaner 16, the intake air is then introduced from upper and lower intake exits 58 and 60 to the turbo charger unit 18. These intake exits 58 and 60 are formed in the rear end face of the upper case 50 of the air cleaner 16 to be vertically juxtaposed.

Figure 4:
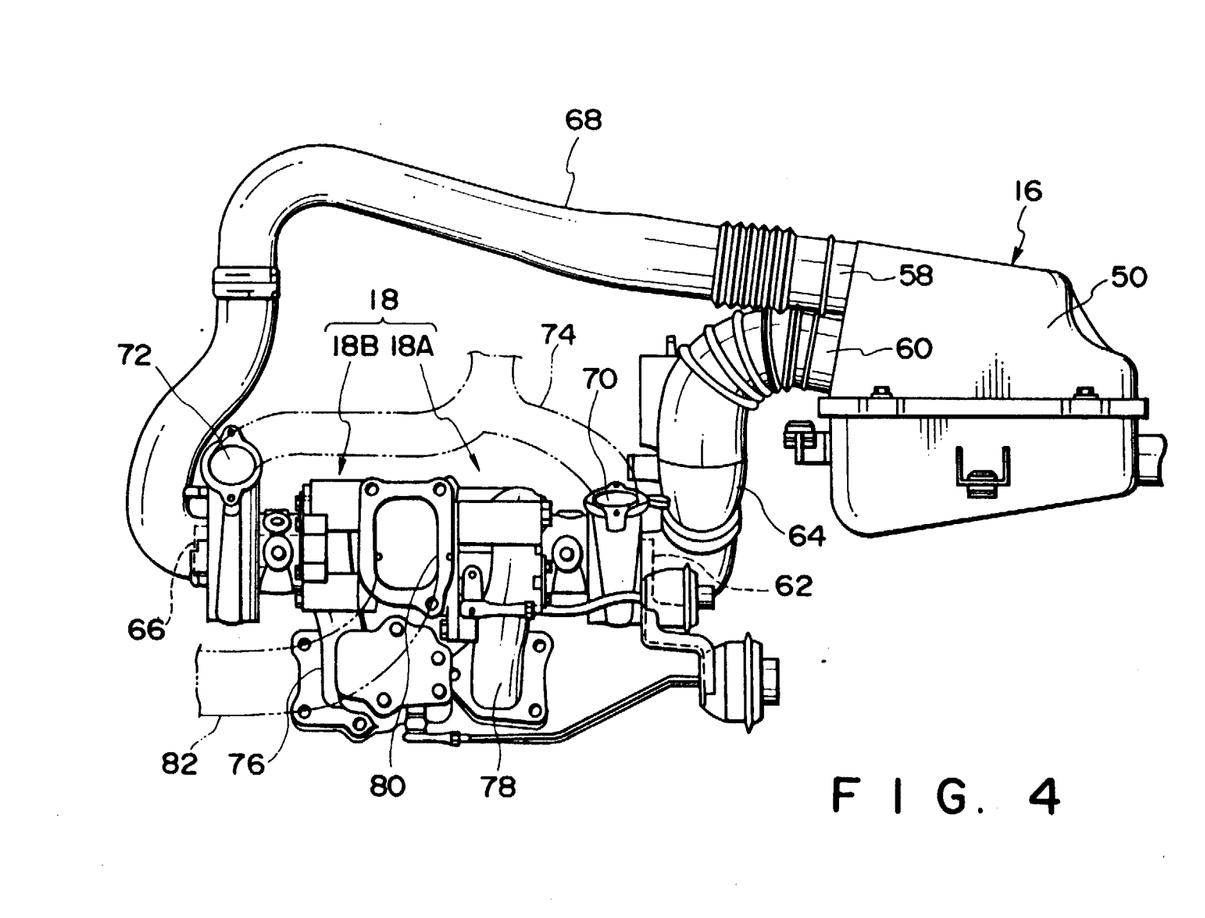
FIG. 4 is a side view taken when a charger of the intake apparatus is viewed from a direction of an arrow A in FIG. 1.

The turbo charger unit 18 comprises a sequential turbo charger system including a low-load turbo charger 18A and a high-load turbo charger 18B, as shown in FIGS. 1 and 4. The turbo charger unit 18 is arranged adjacent to a portion behind the rear portion of the air cleaner 16 as close as possible. The low-load turbo charger 18A is disposed in the front portion of the turbo charger unit 18, and a first intake introduction port 62 is formed in the front portion of the turbo charger 18A. The lower intake exit 60 of the air cleaner 16 is connected to the first intake introduction port 62 via a low-load intake pipe 64 arranged between the turbo charger unit 18 and the air cleaner 16.

The high-load turbo charger 18B is disposed in the rear portion of the turbo charger unit 18, and a second intake introduction port 66 is formed in the rear portion of the charger 18B. The upper intake exit 58 of the air cleaner 16 is connected to the second intake introduction port 66 via an almost L-shaped high-load intake pipe 68 which extends toward the rear portion via a portion above the turbo charger unit 18. In this manner, as can be apparent from FIG. 4, the low-load intake pipe 64 has a length considerably smaller than that of the high-load intake pipe 68, and is arranged below the high-load intake pipe 68 in the engine room 26.

Low- and high-load charged intake exits 70 and 72 are respectively formed in the upper portions of the turbo chargers 18A and 18B. In this manner, the charged intake air flows compressed by the turbo chargers 18A and 18B are introduced into the intercooler 20 via the corresponding charged intake exits 70 and 72 and a charged intake joint pipe 74. The charged intake joint pipe 74 is branched into a Y shape on the side of the turbo charger unit 18, as shown in FIG. 1. The branched end portions of the pipe 74 are respectively connected to the charged intake exits 70 and 72.

Exhaust introduction pipes 76 and 78 which extend downward are connected to the lower portions of the turbo chargers 18A and 18B, respectively. Exhaust gases exhausted from the combustion chambers of the engine 12 are respectively introduced to the corresponding turbo chargers 18A and 18B via these exhaust introduction pipes 76 and 78. The exhaust gases introduced into the turbo chargers 18A and 18B are used to compress intake air by their energies, and are then exhausted from a common exhaust exit 80. The exhaust exit 80 is connected to an exhaust pipe 82. An exhaust gas is cleaned by a catalyst converter (not shown) interposed in the exhaust pipe 82, and its noise level is decreased by a silencer. Thereafter, the exhaust gas is exhausted to the outside.

Figure 8:
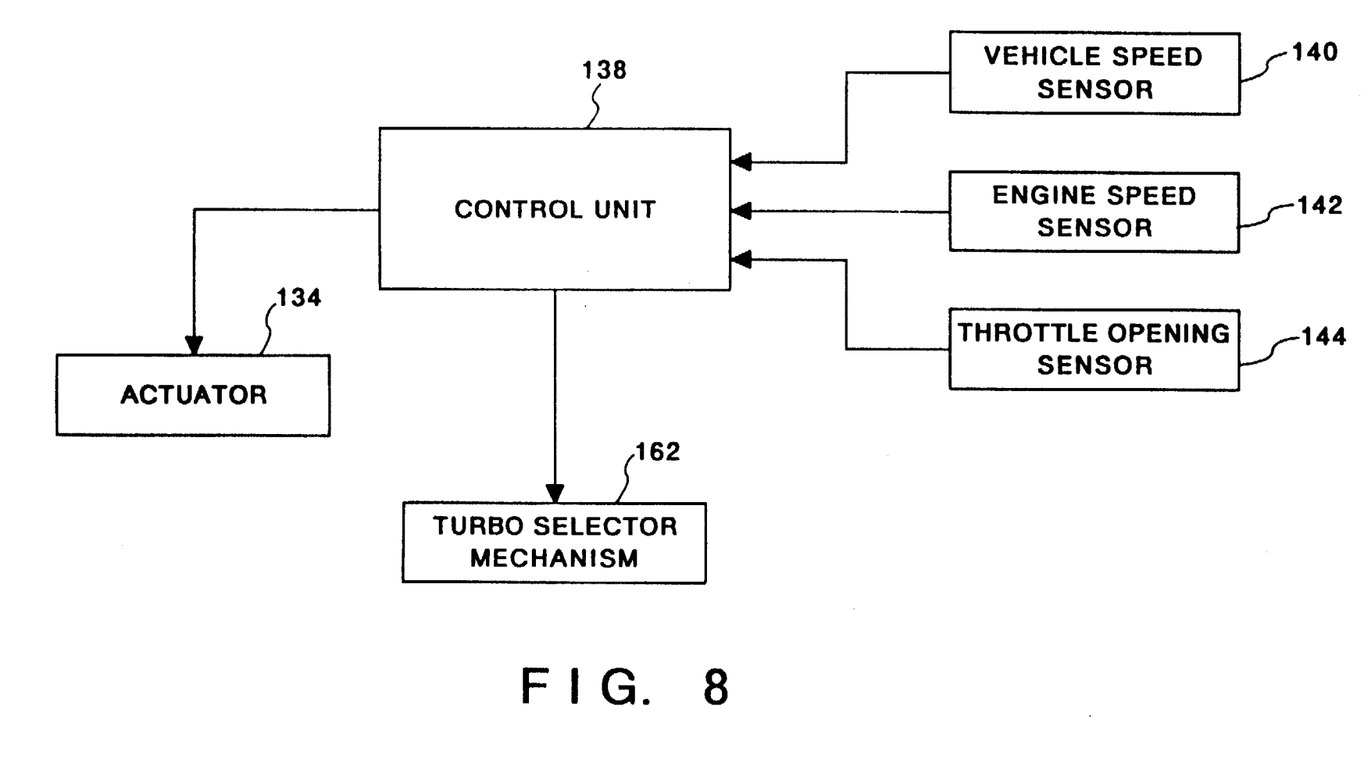
FIG. 8 is a block diagram showing an arrangement of a driving control system of an actuator.

A selector mechanism 162 is connected to the low- and high-load turbo chargers 18A and 18B to select driving states of these chargers. The selector mechanism 162 is connected to a control unit 138 (to be described later), as shown in FIG. 8. Thus, the selector mechanism is controlled as follows. That is, in a low-load driving state, only the low-load turbo charger 18A is driven, and in a high-load driving state, both the low and high-load turbo chargers 18A and 18B are driven.

Figure 2:
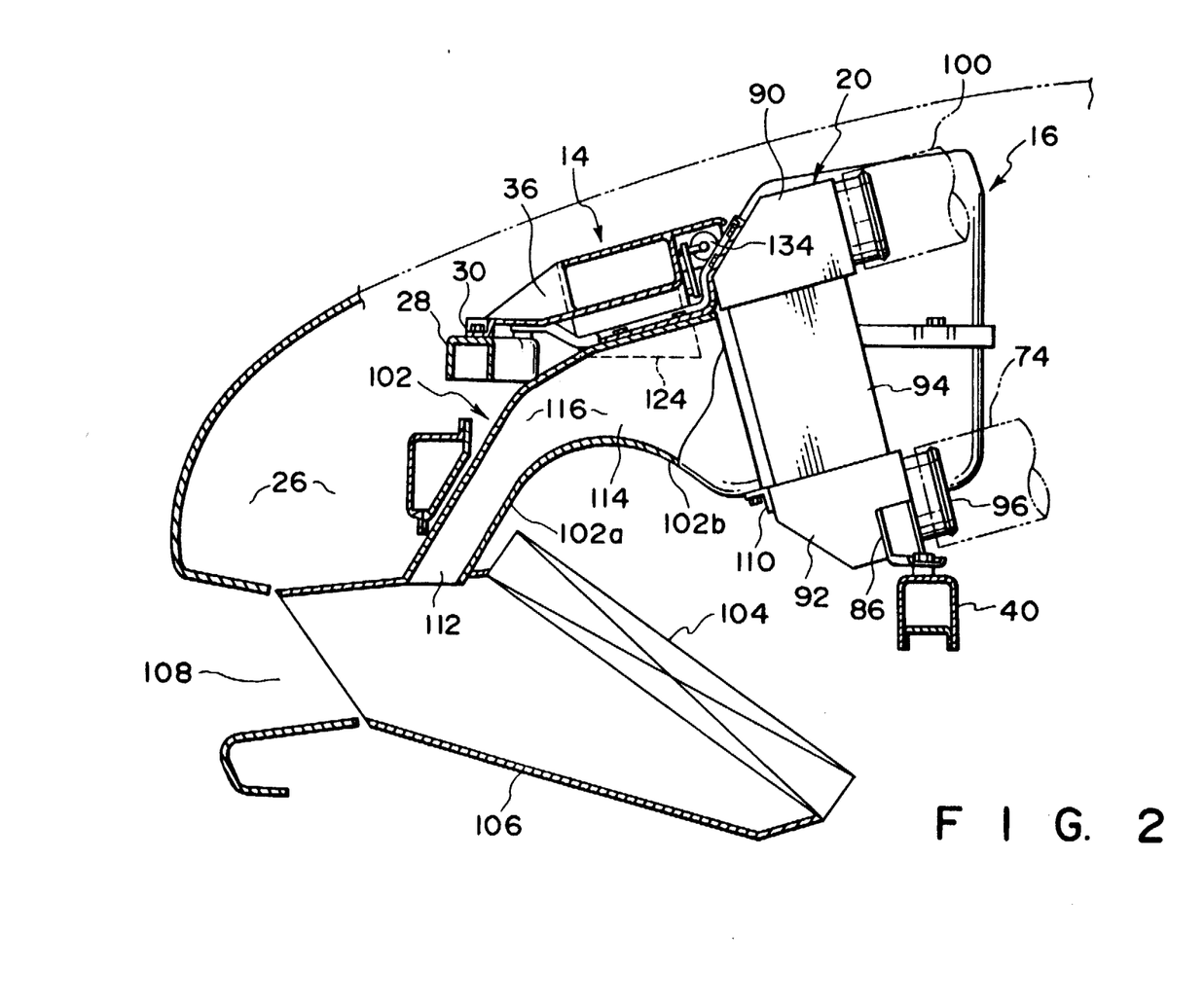
FIG. 2 is a sectional view particularly showing a cooler duct of the intake apparatus taken along a line II—II in FIG. 1.

The intercooler 20 is obliquely arranged behind the intake duct 14 in substantially the central portion of the engine room 26 so that its front surface is directed slightly downward, as shown in FIGS. 1 and 2. The upper end portion of the intercooler 20 is fixed to the first cross member 28 via a bracket 84, and its lower end portion is fixed to the second cross member 40 via a pair of brackets 86 and 88.

The intercooler 20 is constituted by upper and lower tank portions 90 and 92, and a heat exchanger 94 arranged between the two tank portions 90 and 92. A charged intake entrance 96 to which charged intake air is introduced is formed in the right end portion of the rear end face of the lower tank portion 92. A cooled intake exit 98 from which cooled charged intake air is exhausted is formed in the left end portion of the rear end face of the upper tank portion 90.

The downstream end portion of the joint pipe 74 whose upstream portion is branched into two portions, as described above, is connected to the charged intake entrance 96. The cooled intake exit 98 is connected to the throttle valve unit 22 through a joint pipe 100. In this manner, the charged intake air from the turbo charger 18 is cooled by the intercooler 20, and is then supplied to the combustion chambers of the rotary piston engine 12 via the throttle valve unit 22 and the intake manifold 24 in turn. The intercooler 20 is of an air cooling type, which cools charged intake air by travel wind, and a cooler duct 102 for introducing travel wind for cooling travel wind to the heat exchanger 94 is connected to the front side of the intercooler 20.

A radiator 104 is obliquely arranged on the slightly left side of the intercooler 20 and below the two cross members 28 and 40, so that its front portion is inclined obliquely upward, as shown in FIG. 2. A radiator duct 106 is connected to the front side of the radiator 104. In this manner, travel wind is introduced into the radiator 104 via an air intake port 108 formed in a front grille of the vehicle body and the radiator duct 106.

The cooler duct 102 introduces part of travel wind communicating through the radiator duct 106 to the heat exchanger 94 of the intercooler 20. More specifically, an air introduction port 112 defined by the front end opening of the cooler duct 102 is coupled to be open to the upper surface of the radiator duct 106. As shown in FIGS. 1 and 2, the upper wall portion of the cooler duct 102 is fixed to the first cross member 28 via the bracket 84 for fixing the intercooler, and the lower portion of its rear end is fixed to the front end face of the intercooler 20 via a bracket 110.

The cooler duct 102 is designed to have a large path sectional area enough to sufficiently introduce travel wind. The interior of the cooler duct 102 is divided into two left and right paths 116 and 118 by a partition wall 114. The cooler duct 102 extends obliquely backward and to the left from the radiator duct 106 and is connected to the intercooler 20 so that cooling travel wind communicating through the left and right paths 116 and 118 is directed toward the charged intake entrance 96 of the intercooler 20. A substantially straight portion 102a having a relatively low profile is formed in the front half portion of the cooler duct 102. The portion 102a extends obliquely upward toward the rear portion. An enlarged portion 102b is formed in the rear half portion of the cooler duct 102. The enlarged portion 102 largely expands downward, so that its path area is continuously enlarged. The front end portion of the cooler duct 102 extends through the upper wall portion of the radiator duct 106, and is open to the interior of the radiator duct 106 via the above-mentioned air introduction port 112. The rear end portion of the cooler duct 102 is open over substantially the entire area of the front end face of the heat exchanger 94.

Figure 5:
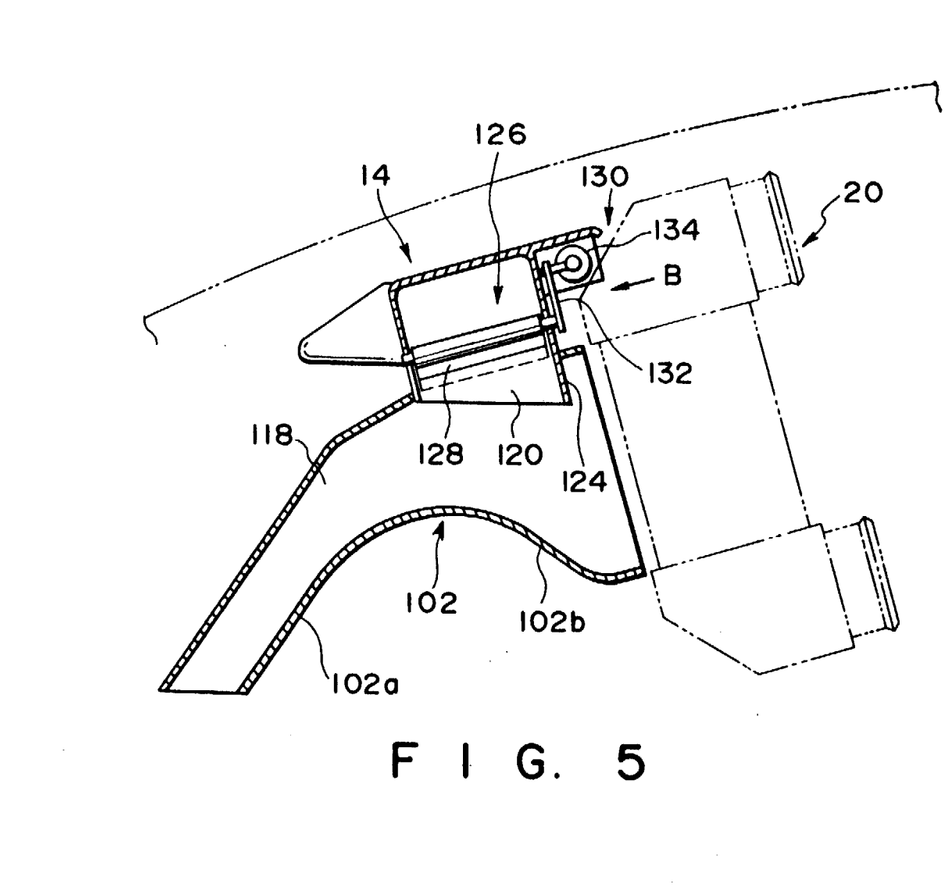
FIG. 5 is a sectional view particularly showing a shutter valve mechanism of the intake apparatus taken along a line V—V in FIG. 1.
Figure 6:
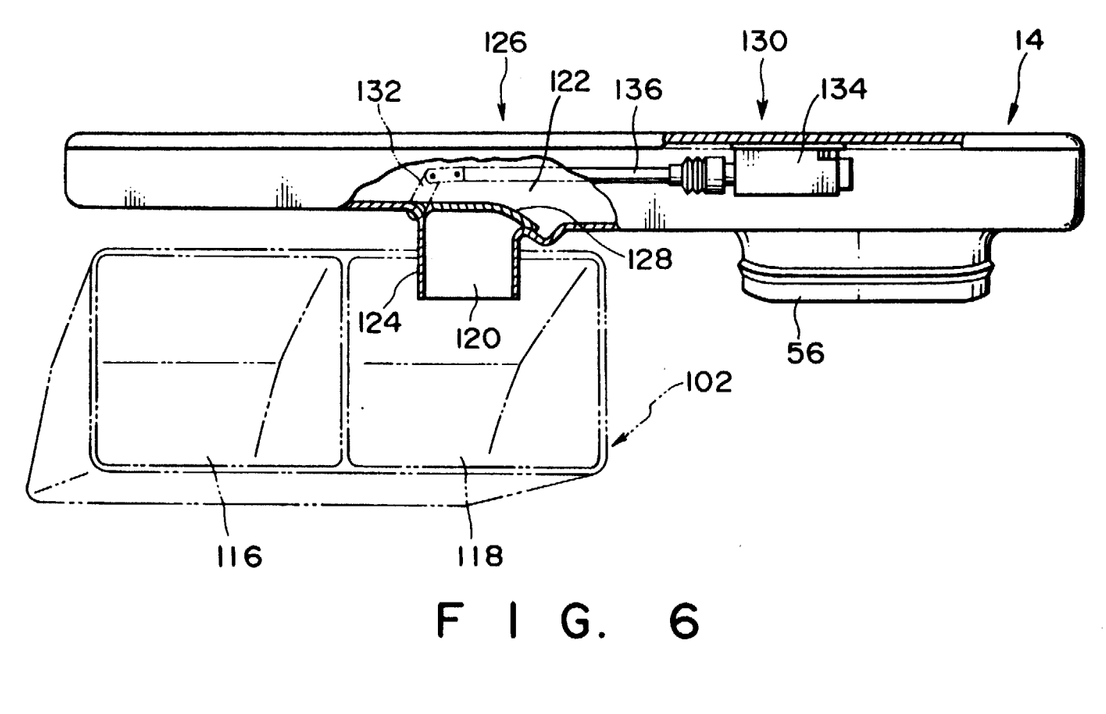
FIG. 6 is a rear view taken when the shutter valve mechanism is viewed from a direction of an arrow B in FIG. 5.

The intake apparatus 10 has a communication path 120 for causing the intake duct 14 and the cooler duct 102 to communicate with each other in order to introduce external intake air at a relatively low temperature into the intake duct 14 when a high output is required in, e.g., an acceleration state. As shown in FIGS. 5 and 6 an opening portion 122 is formed in the lower surface of the middle portion of the intake duct 14. A communication duct 124 is mounted on the lower surface of the intake duct 14 to surround the opening portion 122. The interior of the communication duct 124 is defined as the communication path 120. The communication duct 124 extends through the upper surface of the cooler duct 102, and projects into the right path 118.

A shutter valve mechanism 126 whose degree of opening can be variably adjusted is arranged on the upper end portion of the communication duct 124, as shown in FIG. 4. The shutter valve mechanism 126 comprises a shutter valve 128 which is pivotally arranged in the communication duct 124 to be able to open/close the communication duct 124, and a driving mechanism 130 for pivoting the shutter valve 128. The driving mechanism 130 comprises a swing arm 132 which is pivoted integrally with the shutter valve 128, an actuator 134 as a driving source, and a coupling rod 136 for coupling the actuator 134 and the swing arm 132 to each other.

Upon actuation of the actuator 134, the shutter valve 128 is swung through the coupling rod 136, the swing arm 132, and the like to be switched between a state wherein the communication path 120 is closed, and a state wherein the communication path 120 is open, and the interior of the cooler duct 102 communicates with the downstream portion of the intake duct 14. In the latter state, the upstream portion of the intake duct 14 between the intake port 36 and the opening portion 122 is shielded from the downstream portion by the shutter valve 128, so that intake air from only the cooler duct 102 is introduced into the intake duct 14.

The actuator 134 is connected to a controller 138 for controlling the driving state of the actuator 134 to switch the shutter valve 128. As shown in FIG. 8, the controller 138 receives a signal from a vehicle speed sensor 140 for detecting a vehicle speed, a signal from an engine speed sensor 142 for detecting an engine speed of the rotary piston engine 12, and a signal from a throttle opening sensor 144 for detecting a degree of throttle opening of the throttle valve unit 22, and controls the actuator 134 on the basis of these input signals.

Figure 7:
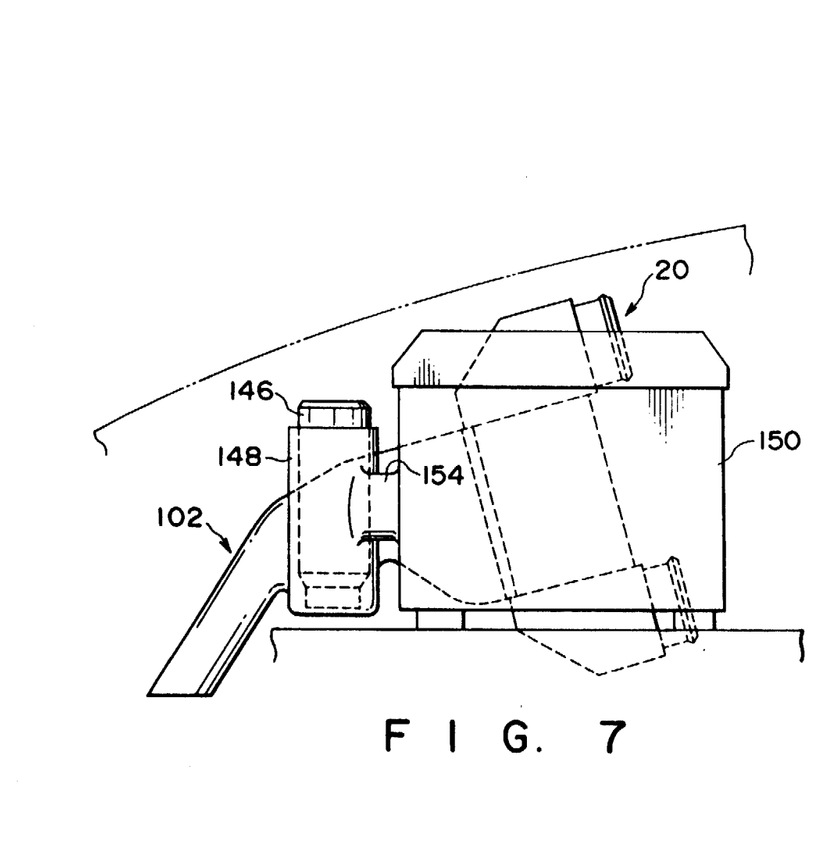
FIG. 7 is a side view of a branch state of a cooler duct of the intake apparatus to a battery when viewed from a direction of an arrow C in FIG. 1.

In this embodiment, as shown in FIGS. 1 and 7, a receiver tank case 148 housing a receiver tank 146 for storing a coolant for an air conditioner is disposed sideways the cooler duct 102 in the left front portion of the engine room 26. A battery case 150 which houses a battery (not shown) is arranged behind the receiver tank case 148. A communication path 152 is arranged to cause the interiors of the cooler duct 102 and the receiver tank case 148 to communicate with each other, so that cooling wind from the cooler duct 102 is guided toward the receiver tank 146. A communication path 154 is arranged to cause the interiors of the receiver tank case 148 and the battery case 150 to communicate with each other, so that the above-mentioned cooling wind is guided to the battery.

The operation of the intake apparatus 10 with the above arrangement will be described below.

When the rotary piston engine 12 is driven, intake air taken into the intake duct 14 from the intake entrance 36 of the left end portion of the intake duct 14 is supplied to the air cleaner 16 via the intake exit of the right end portion of the intake duct 14, the joint portion 56, and the joint pipe 54, so that dust and a foreign matter are removed from the intake air. The cleaned intake air is supplied to the turbo chargers 18A and 18B via the low- and high-load intake pipes 64 and 68, respectively. The intake air is then compressed by the low-load turbo charger 18A or by both the turbo chargers 18A and 18B. Thereafter, the charged intake air is cooled by the intercooler 20. The cooled air is supplied to the combustion chambers of the rotary piston engine 12 via the throttle valve unit 22 and the intake manifold 24.

Upon traveling of this vehicle, travel air introduced from the air intake port 108 of the vehicle front portion shown in FIG. 2 into the radiator duct 106 is supplied to the radiator 104 so as to cool cooling water of the rotary piston engine 12 fed to the radiator 104. Since the air introduction port 112 at the distal end of the cooler duct 102 is open to the interior of the radiator duct 106, part of travel wind introduced into the radiator duct 106 is branched and introduced into the cooler duct 102, and is then supplied to the heat exchanger 94 of the intercooler 20. Thus, intake air whose temperature is increased upon compression by the turbo charger unit 18 is cooled by the travel wind by the intercooler 20. Then, the cooled air is supplied to the combustion chambers of the rotary piston engine 12.

In this intake apparatus 10, the communication path 120 communicating with the interior of the cooler duct 102 is provided to the intake duct 14, and the shutter valve mechanism 126 for opening/closing the communication path 120 is also arranged. The shutter valve 128 of the mechanism 126 is opened/closed through the actuator 134 in accordance with the driving state of the rotary piston engine 12 under the control of the controller 138.

Opening/closing control of the shutter valve 128 by the controller 138 will be described below with reference to the flow chart of FIG. 9.

The controller 138 reads a vehicle speed, an engine speed, and a degree of throttle opening of this vehicle on the basis of signals from the sensors 140, 142, and 144 shown in FIG. 8 in step S10. In step S12, the controller 138 checks if the vehicle speed is lower than a predetermined value (e.g., 40 km/h). If NO in step S12, i.e., when the detected vehicle speed is higher than the predetermined value, the controller 138 then checks based on a change in degree of throttle opening in step S14 if the rotary piston engine 12 is in an acceleration state. If NO in step S14, i.e., if the engine 12 is not in an acceleration state, it is checked in step S16 if a driving region of the rotary piston engine 12 corresponds to a high-load, high-speed region in which the engine speed and the degree of throttle opening exceed predetermined values. If NO in step S16, i.e., if it is determined that the vehicle is in neither in the acceleration state nor the high-load, high-speed region, the shutter valve 128 is closed, i.e., the communication path 120 is closed to shield the intake duct 14 and the cooler duct 102 from each other. Thus, intake air is taken from the intake entrance 36 at the distal end of the intake duct 14 like in the prior art, and is then supplied to the rotary piston engine 12.

If YES in step S14 or S16, i.e., if the rotary piston engine 12 is in the acceleration state or in the high-load, high-speed region, in other words, if a high output is required, the flow advances to step S20, and the controller 138 sets the shutter valve 128 in an open state. In this manner, when the shutter valve 128 is open, the communication path 120 is open, and the cooler duct 102 can communicate with the downstream portion of the intake duct 14. As a result, travel wind introduced from the radiator duct 106 into the cooler duct 102 is then introduced into the intake duct 14. In this manner, intake air is supplied to the rotary piston engine 12 via the intake duct 14, the air cleaner 16, the exhaust turbo charger unit 18, and the intercooler 20.

In this case, the radiator duct 106 and the cooler duct 102 are designed so that they have a sufficiently large path sectional area, and travel wind can be introduced while holding a large dynamic pressure. As a result, a large amount of intake air can be supplied to the rotary piston engine 12 within a short response time by this dynamic pressure. In this embodiment, when a high output is required, an output meeting the requirement can be obtained. In this case, since intake air supplied to the rotary piston engine 12 is low-temperature air taken from the outside of the engine room 26, filling efficiency of intake air can be improved as compared to a case wherein air in the engine room 26 is taken in. Thus, an output can also be increased.

When a high output is required, the intake duct 14 and the cooler duct 102 can communicate with each other through the communication path 120, and an engine intake sound generated in the intake duct 14 is transmitted into the cooler duct 102, and is discharged behind the heat exchanger 94 together with cooling wind passing through the heat exchanger 94 of the intercooler 20. In this manner, this intake sound can reach passengers in a passenger room behind the engine room 26. With this sporty engine intake sound, passengers can experience a comfortable travel feeling, e.g., in an acceleration state.

Figure 9:
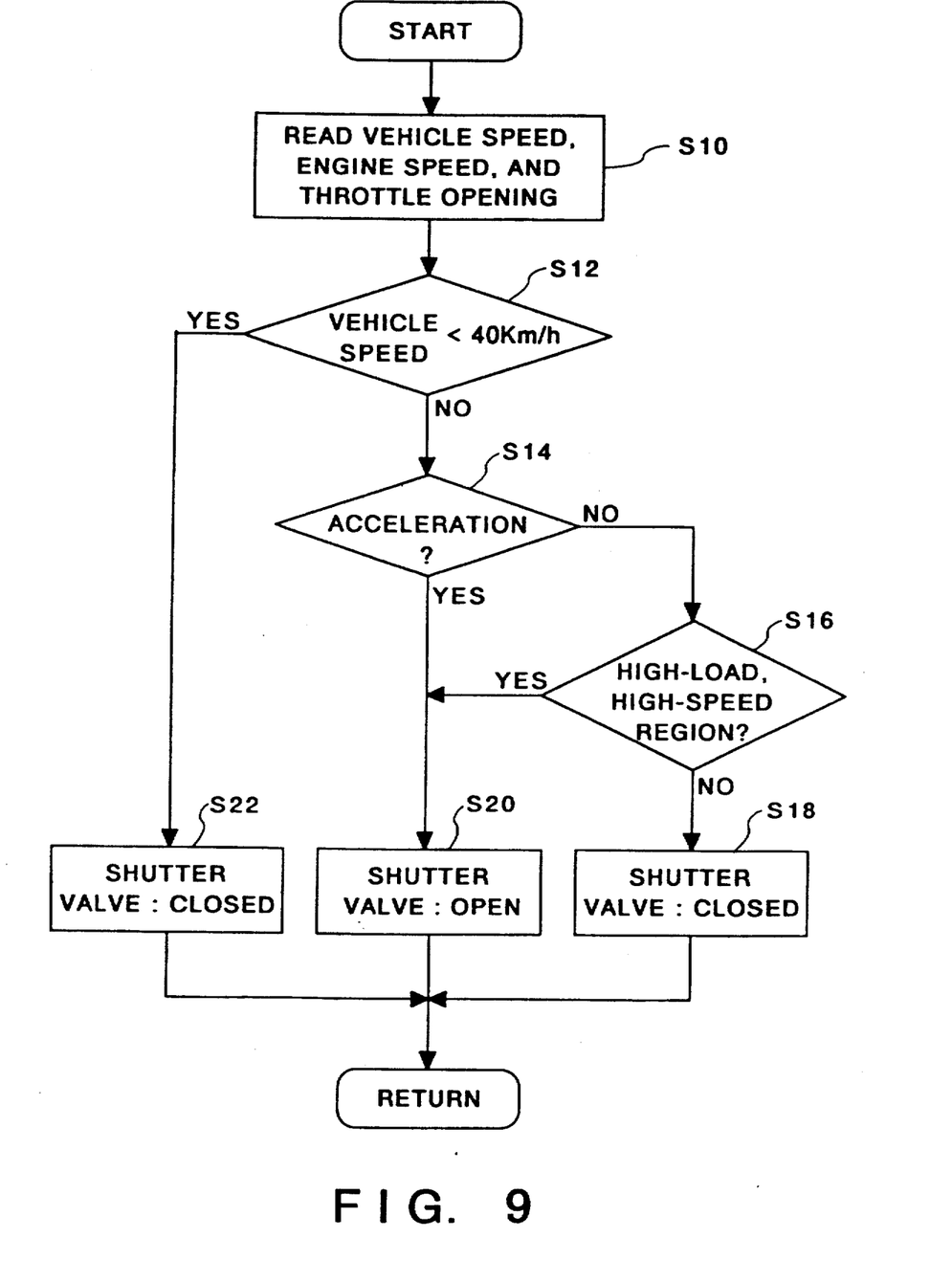
FIG. 9 is a flow chart showing a driving control sequence of the shutter valve by a controller shown in FIG. 8.

If YES is determined in step S12 in the flow chart shown in FIG. 9, i.e., if it is determined that the detected vehicle speed is lower than the predetermined value (40 km/h), the flow advances to step S22, and the shutter valve 128 is closed.

In this embodiment, even when a change in degree of throttle opening is large and it is determined in step S14 that the vehicle is in an acceleration state, the intake duct 14 and the cooler duct 102 do not communicate with each other in a low-speed driving state, and in a so-called engine racing state when a vehicle stands still.

When the cooler duct 102 and the intake duct 14 are caused to communicate with each other in the low-speed driving state wherein travel wind cannot be sufficiently introduced into the cooler duct 102, high-temperature air is taken in from the downstream side of the cooler duct 102 through the heat exchanger 94 of the intercooler 20, resulting in a decrease in intake filling efficiency or output. In the low-speed driving state, casual water on a road surface tends to be taken into the radiator duct 106 or the cooler duct 102, and this water may flow from the intake duct 14 into the rotary piston engine 12. In this embodiment, when the vehicle travels at a low speed or stands still, the intake duct 14 and the cooler duct 102 are shielded from each other, thereby preventing the above-mentioned drawbacks.

In this embodiment, since part of travel wind is introduced from the cooler duct 102 into the receiver tank case 148 via the path 94, a coolant for the air conditioner in the receiver tank 146 is cooled, and the coolant can be prevented from degradation due to an increase in temperature. In addition, since travel wind is introduced from the receiver tank case 148 into the battery case 150 through the path 154, an increase in temperature of the battery can also be prevented.

The present inventors conducted experiments associated with an engine intake sound giving a comfortable travel feeling to passengers. The experimental results will be explained below with reference to FIG. 10.

Figure 10:
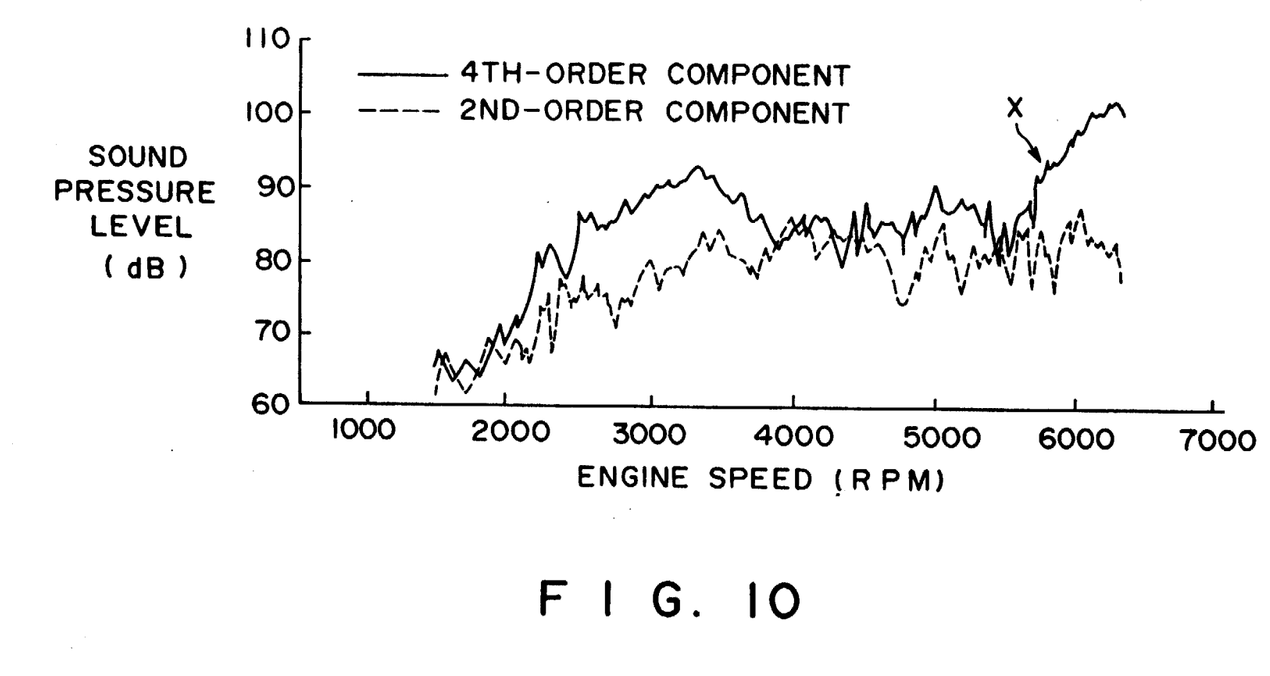
FIG. 10 is a graph showing experimental results associated with an intake sound of an engine which employs the intake apparatus of the present invention.

FIG. 10 shows sound pressure levels of 2nd- and 4th-order components of an engine speed immediately behind the intercooler 20 in a state wherein the intake duct 14 and the cooler duct 102 communicate with each other. As can be understood from FIG. 4, a 2nd-order component as an uncomfortable clouded noise in a passenger room is kept substantially constant with respect to an increase in engine speed, while a sound pressure level of a 4th-order component giving a comfortable travel feeling to passengers is increased, as indicated by an arrow X, as an engine speed increases in a high-engine speed region. More specifically, it was demonstrated that the intake apparatus 10 of this embodiment could provide a comfortable engine intake sound.

In this embodiment, the low-load turbo charger 18A constituting the front portion of the turbo charger unit 18 is arranged behind the air cleaner 16 as close as possible, thereby shortening the low-load intake pipe 64. Thus, the intake path length in the low-load driving state can be shortened, and a response time in the low-load driving state, in particular, an acceleration response time can be shortened.

In the low-load state including an idling state before or after warming up of an engine, an intake air amount and a fuel supply amount are small, and a combustion property tends to be decreased. Since the low-load intake pipe 64 is connected to the front portion of the low-load turbo charger 18A, intake air communicating through the low-load intake pipe 64 is heated by an atmosphere at a relatively high temperature, which is heated by heat of an exhaust system in the lower portion of the engine room 26. As a result, gasification and atomization of fuel are accelerated, thus improving a combustion property.

The high-load intake pipe 68 is connected to the high-load turbo charger 18B via a portion above the turbo charger unit 18. Therefore, the intake pipe 68 is arranged in an atmosphere at a relatively low temperature in the upper portion of the engine room 26, and is not easily heated. Thus, it is preferable to improve filling efficiency.

As described above, the low-load intake pipe 64 is shortened as much as possible, and is arranged in the lower portion of the engine room 26. With this simple arrangement, an intake supply response time in the low-load driving state can be shortened, and a combustion property can be improved.

The present invention is not limited to the arrangement of the above embodiment, and various changes and modifications may be made within the spirit and scope of the invention.

For example, in the above embodiment, the present invention is applied to the intake apparatus 10 of the rotary piston engine 12. However, the present invention is not limited to this arrangement, and may be similarly applied to an intake apparatus of a reciprocating engine.

Figure 11:
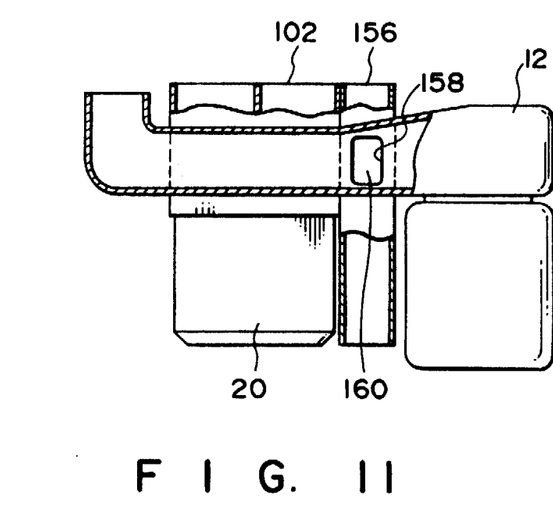
FIG. 11 is a schematic plan view showing an arrangement of another embodiment of an intake apparatus for an engine according to the present invention.

FIG. 11 shows an arrangement of another embodiment of an intake apparatus according to the present invention. In this embodiment, an auxiliary intake duct 156 through which travel wind passes in a back-and-forth direction is arranged in addition to a cooler duct 102 for supplying travel wind to the intercooler 20. A communication portion 158 is formed between the auxiliary intake duct 156 and an intake duct 14, and comprises a switching valve 160 which is opened in, e.g., an acceleration state.

According to this embodiment, an engine intake sound generated in the intake duct 14 is transmitted from the communication portion 158 to the interior of the auxiliary intake duct 156, and is discharged backward from an opening portion at the rear end of the auxiliary duct 156. In this embodiment, a comfortable travel feeling can be given to passengers as in the above embodiment.

In the above embodiment, the intercooler 20 is employed as a cooling device. When an oil cooler and an oil cooler duct for introducing travel wind to the oil cooler are arranged in the engine room 26, the same effect as described above can be obtained by utilizing this duct.

What is claimed is:

1. An intake apparatus for an engine, which comprises:
   an intake duct, arranged in an engine room, for supplying intake air to the engine;
   cooling means, arranged in said engine room, for cooling intake air;
   an auxiliary duct connected to said intake duct and designed so that the intake air can be further introduced thereto, the auxiliary duct including a cooling duct for introducing travel wind as cooling air to said cooling means, and a communication duct for causing said cooling duct to communicate with said intake duct; and
   valve means, arranged in said auxiliary duct, for causing said auxiliary duct to communicate with said intake duct in a specific driving state requiring a high engine output.

2. The intake apparatus according to claim 1, wherein said valve means is disposed in said communication duct to be able to open/close said communication duct.

3. The intake apparatus according to claim 2, wherein said communication duct communicates with said intake duct at a downstream side of an air intake port of said intake duct.

4. The intake apparatus according to claim 1, which further comprises:
   charging means, interposed in said intake duct, for compressing and charging the intake air flowing through said intake duct, and wherein
   said cooling means comprises an intercooler for cooling the intake air compressed by said charging means.

5. The intake apparatus according to claim 1, wherein said cooling duct is open to the outside of said engine room.

6. The intake apparatus according to claim 1, wherein said valve means includes:
   a shutter valve pivotally disposed in said auxiliary duct to be able to open/close said auxiliary duct;
   driving means for pivoting said shutter valve; and control means for controlling said driving means so that said shutter valve is opened in the specific driving state requiring the high engine output.

7. The intake apparatus according to claim 6, wherein said control means decides a requirement of the high engine output on the basis of vehicle speed information, engine speed information, and throttle opening degree information.

8. The intake apparatus according to claim 6, wherein said driving means includes:
- a driving source mounted on an outer surface of said intake duct; and
- a link mechanism for transmitting a driving force of said driving source to said shutter valve.

9. The intake apparatus according to claim 1, further comprising a partition wall along a widthwise direction of a vehicle body for dividing said cooling duct into left and right paths, and
wherein said communication duct projects into and communicates with one of said left and right paths.

10. The intake apparatus according to claim 4, which further comprises an air cleaner, communicating with an intake exit of said intake duct, for cleaning intake air flowing from the intake exit.

11. The intake apparatus according to claim 10, wherein said charging means comprises a low-load charger driven in a low-load state of the engine, and a high-load charger driven in a high-load state of the engine,
said low- and high-load chargers being connected to said air cleaner respectively through low- and high-load intake paths.

12. The intake apparatus according to claim 11, wherein said low-load intake path is arranged below said high-load intake path.

13. The intake apparatus according to claim 12, wherein said low-load intake path is connected to said air cleaner at a position below said high-load intake path.

14. The intake apparatus according to claim 11, wherein said low-load intake path is set to be shorter than said high-load intake path.

* * * * *